Sept. 23, 1947.  G. H. SITTNER  2,427,930
APPARATUS FOR CONTINUOUSLY SHEATHING CORES OF MATERIAL
Filed Sept. 28, 1945
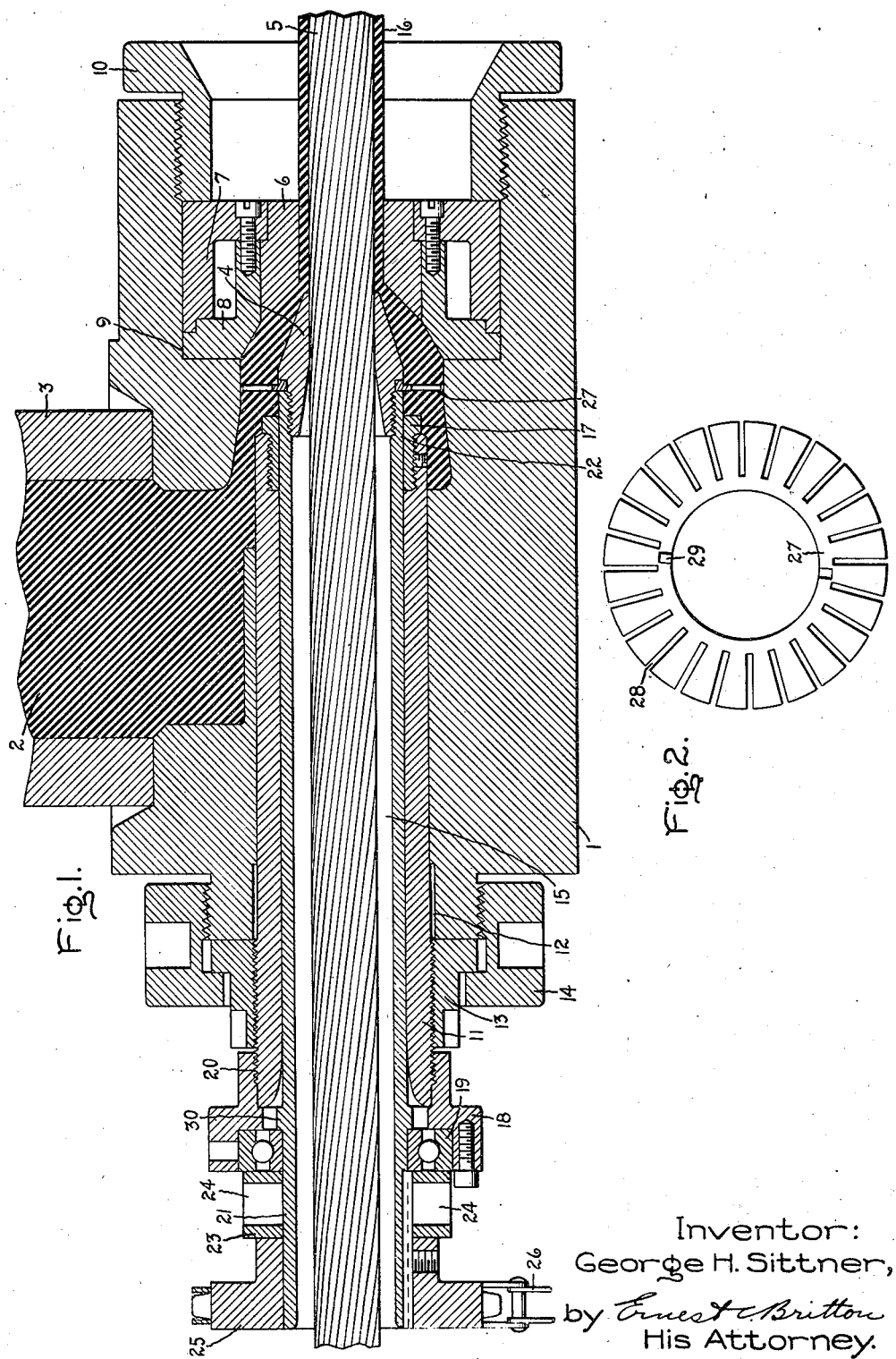
Inventor:
George H. Sittner,
by Ernest␣Britton
His Attorney.

Patented Sept. 23, 1947

2,427,930

UNITED STATES PATENT OFFICE 2,427,930

APPARATUS FOR CONTINUOUSLY SHEATHING CORES OF MATERIAL

George H. Sittner, Schenectady, N. Y., assignor to General Electric Company, a corporation of New York Application September 28, 1945, Serial No. 619,174

2 Claims. (Cl. 18—13)

My invention relates to apparatus for continuously sheathing cores of material, and more particularly to an apparatus for extruding a sheath or jacket upon wires and cables.

The extrusion method of applying, particularly an insulating sheath or jacket, to wires or cables has been in use for many years. Such machines, an example of which is disclosed in United States Letters Patent 1,770,985, Kivley, which are often referred to as tubing machines, usually comprise a hopper into which the thermoplastic or thermosetting material to be extruded is fed. The material is heated to an extrudable condition in the machine which is provided with a conveying screw which forces the extrudable material under high pressure into the extrusion head where a die is provided which causes this material to surround the wire or cable to form a sheath or jacket for the same. Such tubing machines have caused considerable difficulty particularly when used with certain kinds of sheathing material due to inherent faults in the tubing machines which are known to the trade as lack of stream lining in the extrusion head and pockets in the extrusion head in which the plastic substance gathers in what are called "cold" or "dead" spots. These cold or dead spots affect the uniformity of flow of the plastic material not only causing seams and openings in the sheath or jacket, but also causing poor concentricity of the jacket relative to the wire or cable. These cold or dead spots usually occur in the slower moving portion of the plastic material just prior to its application to the cable in the forming die. In order to correct these difficulties, manufacturers have provided bleeder valves in the extrusion heads of tubing machines so that more movement of the slower moving portion of the plastic material is obtained through escape of some of the material through the bleeder valve. Even with the bleeder valve wide open very unsatisfactory results are obtained with certain kinds of extrudable material and in addition a considerable loss of material is occasioned through the bleeder valve.

Attempts have also been made to improve the flow of the plastic compound or extrudable material in the extrusion head by inserting baffle plates in the chambers of the head to direct the flow of the extrudable material to produce a sort of stream lined flow. The only results found with the use of such baffle plates, however, have been to change the positions of the dead spots with no improvement in the finished sheath or jacket.

It would be desirable to provide an extrusion head for a tubing machine in which all dead or cold spots in the extrudable material adjacent the point where it is applied to the wire or cable are completely removed and a uniform temperature throughout the movable mass of extrudable material is obtained.

It is an object of my invention to provide a new and improved extrusion head for tubing machines which overcomes the disadvantages of prior art arrangements enumerated above.

It is another object of my invention to provide an improved extrusion head in which the extrudable material passing through the head is constantly agitated not only to provide additional plasticity but to maintain uniform temperature and pressure.

Still another object of my invention is to provide a movable agitator, which may readily be adapted with the extrusion head of any tubing machine, which agitates the extrudable material to eliminate any cold or dead spots at a point just ahead of the forming die.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a sectional view of the extrusion head of a tubing machine embodying my invention, and Fig. 2 is an enlarged view of the agitator embodied in my invention shown in Fig. 1.

Referring now to the drawing, there is illustrated an extrusion head 1 for a tubing machine which may be of any well known construction. A complete description of the tubing machine is not essential for an understanding of my invention. It suffices to say that the tubing machine is provided with a conveying screw which forces the extrudable material generally indicated at 2 and illustrated as insulating material, through a chamber 3 into extrusion head 1 which is preferably supported from chamber 3. As illustrated the axis of the extrusion head 1 is perpendicular to the axis of the chamber 3 which may be referred to as the feed screw chamber. The material to be extruded, which may comprise a thermosetting or thermoplastic material, may be supplied to the tubing machine as cold, granular stock in one extreme, or hot, milled stock in the other extreme. When the extrudable material 2 reaches extrusion head 1, it is in a hot plastic condition.

The extrusion head of a tubing machine generally includes a guider or leader, such as is indicated at 4, which is provided with an opening through which cable or wire such as 5 may be moved during the jacketing or sheathing operation. Guider or leader 4 is positioned so that the hot compound or extrudable substance may flow around it to encircle the core to be sheathed or jacketed. A suitable die 6 forms the coating on the cable 5. Die 6 is preferably removably supported by suitable die holders 7 and 8 which may be positioned in a recess 9 in extrusion head 1. A suitable locking nut 10 insures that the die is properly held in position in the head 1.

Guider or leader 4 in prior art arrangements is preferably capable of movement along the axis of wire or cable 5, whereby the flow of plastic material toward the die may be controlled. In order to control such longitudinal movement of guider 4 and also to support the same in prior art arrangements, a longitudinally adjustable sleeve 11 is provided within extrusion head 1. Sleeve 11 is mounted in extrusion head 1 and is prevented from rotating relative thereto by means of a suitable key, not shown. Movement of sleeve 11 may be obtained by rotation of an adjusting nut 13 which when final adjustment is completed, is held in position by locking nut 14. The end of longitudinal adjusting sleeve 11 adjacent die 6 in prior art arrangements directly supports guider or leader 4. In such prior art arrangements the wire or cable 5 slowly moved through the chamber 15 defined in extrusion head 1. The extrudable material 2 supplied by a screw (not shown) was forced around guider 4 and a sleeve or jacket 16 was formed by virtue of die 6. It is quite apparent that the extrudable material flowing around the cable 5 by virtue of the non-streamlined flow, is likely to have slow moving portions forming cold or dead spots and as a practical matter this was found to occur with the resultant jacket or sheath having inherent defects and often having very poor concentricity.

In accordance with my invention an arrangement is provided to constantly agitate the extrudable substance as it passes through the extrusion head 1 before it passes through die 6 whereby additional plasticity and the maintenance of uniform temperature and pressure throughout the material at this point is obtained. In accordance with my invention guider or leader 4 is not supported by adjustable sleeve 11 but instead sleeve 11 supports at its end adjacent die 6 a suitable alloy bearing 17. At the other end of adjustable sleeve 11 there is provided a bearing holder 18 for supporting a ball bearing race 19. Bearing holder 18 is threadedly supported on sleeve 11 as is indicated at 20. Rotatable within bearing 17 and the bearing incorporated in bearing race 19 is a rotatable tube 21 which is threaded at one end as indicated at 22 to support guider 4. The other end of rotatable tube 21 is provided with a collar 23, having openings 24 therein for accommodating a manual lever or wrench, and a sprocket wheel 25 which may be driven from a suitable motor through chain 26.

Also in accordance with my invention I provide an agitator 27, best shown in Fig. 2 as an annular disk having a plurality of slots 28 cut around the circumference thereof. Agitator 27 is keyed by means of an integral key 29 with guider 4 so as to rotate with rotatable tube 21 and guider 4. Agitator 27 substantially fills the annular space around guider 4 through which the extrudable material 2 must pass during the tubing operation. I have found that very satisfactory operation can be obtained by rotating tube 21 and consequently agitator 27 at a relatively slow speed such as approximately 6 R. P. M. whereby the extrudable material is constantly agitated as it is extruded onto the cable in its passage over guider 4 prior to being sized while passing through die 6.

It should be understood that sprocket 25 may be driven from any suitable means such as a separate motor provided with a gear reducer. Although I have illustrated the agitator as being driven from the left-hand end of the extrusion head 1 as viewed in Fig. 1, it will be obvious that it might also be driven from the die end of the extrusion head. Also although the agitator 27 is illustrated as having a rotational movement, an oscillating motion might be applied thereto through suitable driving means which would also produce the desired result of eliminating dead or cold spots.

In the operation of my new and improved cable sheathing or jacketing device, a metal dummy is first inserted in extrusion head 1 and the extrudable material, which is usually insulating material, is extruded on the dummy to obtain the correct tubing for concentricity and thickness. At this time adjustable sleeve 11 is moved longitudinally which causes movement of guider 4 by virtue of the shoulder 30 on rotatable tube 21 adjacent bearing race 19. When the proper adjustments have been made the cable 5 is inserted through extrusion head 1 and insulated or jacketed to the correct diameter which can be obtained by increasing or decreasing the cable speed through guider 4.

With my invention it has been found possible to greatly increase the output aside from the fact that a much more satisfactory product is obtained. Also by virtue of rotating guider 4 a tighter fitting guider with respect to cable 5 may be employed whereby a higher degree of concentricity of the jacket or sleeve 16 is obtained. The rotating or movable agitator prevents the formation of so-called cold or dead spots and improved plasticity of the compound due to this agitation is also obtained. No bleeder valve, with the consequent loss of material therethrough, need be employed and I have also found that the apparatus may be run at lower temperatures in the extrusion head 1 which results in a reduced porosity of the jacket or sheath. Also with my invention, a simple adjustment for concentricity may be made with a dummy and no other adjustment is necessary when the cable is inserted in the extrusion head.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an apparatus for producing a sheath of extrudable insulating material on a movable core, a chamber for containing extrudable material under pressure, an extrusion head to be supplied with extrudable material from said chamber and having an opening through which the core is movable, a die positioned in said opening for forming the sheath on the core, a rotatable guider in said head for guiding the flow of extrudable material to said die and having an opening through which the core is movable to said die, and a slotted annular disk rotated by and extending radially from said guider for agitating said material.

2. In an apparatus for producing a sheath of extrudable insulating material on a movable core, a chamber for containing extrudable material under pressure, an extrusion head to be supplied with extrudable material from said chamber and having an opening through which the core is movable, a die positioned in said opening for forming the sheath on the core, a tube rotatably mounted in said head and surrounding the core prior to its entrance into said die, a guider secured to and surrounding said tube at the die end thereof for guiding the flow of extrudable material to said die, and a slotted annular disk connected to and extending radially from die end of said tube for agitating said material as it approaches said die.

GEORGE H. SITTNER.

REFERENCES CITED

The following references are of record in the file of this patent:

UNITED STATES PATENTS

| Number | Name | Date |
|---|---|---|
| 655,706 | Gillmore | Aug. 14, 1900 |
| 1,595,470 | Johnson | Aug. 10, 1926 |
| 2,257,067 | Parsons | Sept. 23, 1941 |
| 2,262,989 | Conklin | Nov. 18, 1941 |
| 678,039 | Royle | July 9, 1901 |
| 1,859,901 | Trebes | May 24, 1932 |

FOREIGN PATENTS

| Number | Country | Date |
|---|---|---|
| 343,300 | Italy | Sept. 21, 1936 |